US008244872B2

(12) United States Patent
Charlson et al.

(10) Patent No.: US 8,244,872 B2
(45) Date of Patent: Aug. 14, 2012

(54) EDUCATIONAL ADAPTIVE PROVIDER ARCHITECTURE

(75) Inventors: Ellery Charlson, Bothell, WA (US); Lei Wang, Redmond, WA (US); Mohamed Rouatbi, Bellevue, WA (US); Parul R. Manek, Redmond, WA (US); Rajeev Mittal, Redmond, WA (US); Xin Li, Redmond, WA (US); Zhipeng Zhao, Bellevue, WA (US); Zubin Alexander, Bothell, WA (US); Kevin Casey Gammill, Beaux Arts, WA (US); Qin Zhou, Kirkland, WA (US); Manjusha M. Mangaonkar, Bellevue, WA (US); Brian James Hardy, Duvall, WA (US)

(73) Assignee: Microsoft Corp., Redmond, WA (US)

( * ) Notice: Subject to any disclaimer, the term of this patent is extended or adjusted under 35 U.S.C. 154(b) by 490 days.

(21) Appl. No.: 12/482,985

(22) Filed: Jun. 11, 2009

(65) Prior Publication Data

US 2010/0318657 A1    Dec. 16, 2010

(51) Int. Cl.
G06F 15/173 (2006.01)
(52) U.S. Cl. ............. 709/226; 705/1; 705/326; 709/200
(58) Field of Classification Search .................. 709/226, 709/200; 705/1, 326
See application file for complete search history.

(56) References Cited

U.S. PATENT DOCUMENTS

| | | | |
|---|---|---|---|
| 7,085,800 B2 | 8/2006 | Abbott et al. | |
| 7,512,627 B2 | 3/2009 | Hossfeld et al. | |
| 2001/0044728 A1 | 11/2001 | Freeman et al. | |
| 2005/0097441 A1* | 5/2005 | Herbach et al. | 715/501.1 |
| 2005/0159999 A1 | 7/2005 | Totten et al. | |
| 2008/0004887 A1* | 1/2008 | Brunswig et al. | 705/1 |
| 2008/0140857 A1* | 6/2008 | Conner et al. | 709/236 |
| 2008/0162158 A1* | 7/2008 | Cartmell | 705/1 |
| 2008/0189401 A1* | 8/2008 | Maes | 709/223 |
| 2009/0077636 A1 | 3/2009 | Duffie, III | |
| 2010/0005466 A1* | 1/2010 | MacFarlane et al. | 718/100 |
| 2010/0070553 A1* | 3/2010 | Addala et al. | 709/202 |
| 2011/0213840 A1* | 9/2011 | Boyer et al. | 709/205 |

OTHER PUBLICATIONS

Dai, et al. "Intelligent Adaptive Services for On-demand Systems Integration" Retrieved at<<http://ieeexplore.ieee.org/stamp/stamp.jsp?amumber=04276459>>, 6th IEEE/ACIS International Conference on Computer and Information Science (ICIS 2007), pp. 6.
Denaro, et al."Adaptive Integration of Third-Party Web Services ", Retrieved at<<http://portal.acm.org/citation.cfm?id=1083088>>, DEAS 2005, May 21, 2005, St. Louis, Missouri, USA, pp. 6. Bohme, et al."Integration of Heterogenous Services in the Adaptive Services Grid", Retrieved at<<http://www.dcl.hpi.uni-potsdam.de/papers/papers/GSEM_2005_Harald_Boehme_and_Alexander_Saar.pdf>>, pp. 13.
"eRepSim", Retrieved at<<http://sourceforge.net/projects/erepsim/>>, May 5, 2009, p. 1.

* cited by examiner

*Primary Examiner* — John Follansbee
*Assistant Examiner* — Anthony Mejia
(74) *Attorney, Agent, or Firm* — Lyon & Harr, LLP; Katrina A. Lyon (57) ABSTRACT

The educational adaptive provider architecture described herein provides a way for an educational services framework to be built on varying underlying existing technologies without any changes in the object model and services. The provider framework supports the ability to have multiple types of providers for various services, such as, for example, for authorization, authentication, communication, grouping, scoring, social-networking, storage and user functions. The educational adaptive provider architecture provides easy integration of existing institutional and educational service deployments.

20 Claims, 5 Drawing Sheets

EDUCATIONAL ADAPTIVE PROVIDER ARCHITECTURE

BACKGROUND

Many institutions and educational providers rely on computer systems for teaching classes and providing other types of services. These computer systems often rely on different providers of services to provide them with, for example, authorization to access their computer system, user authentication, grouping of various users into work groups, classes and the like, scoring or assessment of exams or other items, social networking, data storage and other user functions. Institutional and educational deployments of computer systems are different, and have existing underlying technological provider investments which are hard to change and difficult to integrate and use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the educational adaptive provider architecture described herein provides a way for an educational services framework to be built on varying underlying existing technologies without any changes in the object model and services. The provider framework supports the ability to have multiple types of providers for various services, such as, for example, for authorization, authentication, communication, grouping, scoring, social-networking, storage and user functions. The educational adaptive provider architecture provides easy integration of existing institutional and educational service deployments.

More specifically, one embodiment of the educational adaptive provider architecture operates as follows. A request for computer services is received from a requester such as a user. For example, the service requested might be for authorization to access a computer system, user authentication, grouping of various users into a class, scoring or assessment of an exams, access to a social networking site or a class that is being taught, data storage or other user functions. The service request is reformatted into a format required by a pluggable external service or service provider of a set of pluggable external service providers. A pluggable service or service provider is one that is capable of being plugged in without significant interruption to a system that is operating. It is a configurable service that does not have to be preconfigured. (For the purpose of this disclosure the terms pluggable service and pluggable service provider will be used interchangeably.) Once created, the reformatted service request is then sent to a selected pluggable external service provider for servicing (e.g., providing the service requested). The requested service response is then obtained from the pluggable external service provider. The requested service response can be reformatted into a format usable by the requester, if necessary. The requested service response, either reformatted or not, is then provided to the requester.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the educational adaptive provider architecture, reference is made to the accompanying drawings, which form a part thereof, and which is shown by way of illustration examples by which the educational adaptive provider architecture may be practiced. It is to be understood that other embodiments may be utilized and structural changes may be made without departing from the scope of the claimed subject matter.

1.0 Educational Adaptive Provider Architecture

The educational adaptive provider architecture described herein provides a way to support multiple provider technologies in the educational domain (or other domain for that matter) and provides for the easier adoption of different services and different service providers. It also helps extensibility without causing disruption to the applications, services or utilities that are built on existing services and entity architectures. The educational adaptive provider architecture provides integrated transactional-capability, error-handling and compensation-logic, and also supports providers for (but not limited to) authorization, authentication, communication, grouping, scoring, social-networking, storage and user functions.

1.1 Overview

The educational adaptive provider architecture described herein provides a way to support multiple service provider technologies in the educational domain. The educational adaptive provider architecture is not limited to existing service providers (such as, for example, for authorization, authentication, communication, grouping, scoring, social-networking, storage and user functions), but can also support additional providers, such as, for example, custom providers, at the same time, and provides the ability to add a custom provider for each pluggable provider category. The architecture also provides a way to turn off an external service provider if, for example, an institutional computer system does not have any provider technology investments in that provider area or if a software application chooses not to utilize a provider.

The educational adaptive provider architecture works for cloud hosted (e.g. hosted over a network such as the Internet) and locally-hosted institutional scenarios. The architecture employs pluggable external service providers, and they can be totally different for different institutional deployments. The architecture helps to seamlessly integrate pluggable external service provider technologies into an existing education services architecture without changes to any exposed Application Programming Interfaces (APIs). For example: A university may have an existing user services provider. The architecture helps to expose the existing user services provider capability in a consistent and similar manner to other existing services employed in an existing educational computer system and hence requires no changes in the exposed education services APIs. If the institution decides to the switch from an existing user services provider to a different user services provider supported by the educational adaptive provider architecture, only configuration changes are needed to consume the internal and external service providers since both external providers are supported in the educational adaptive provider architecture. Institutions do not have to change applications, services and utilities that are built on the existing computer system framework.

1.1.1 Pluggable Provider Framework for Educational Services:

The educational adaptive provider architecture interfaces with pluggable external service providers. A pluggable service provider is one that is capable of being plugged in without significant interruption to a system that is operating. It is a configurable service provider that does not have to be preconfigured. The use of pluggable external service providers allows the architecture to provide the ability to add, change or remove external service providers for communications, grouping, scoring, social-networking, storage and other user services via configuration settings.

1.1.2 Integrated Transactional Capability

The educational adaptive provider architecture provides the ability to make provider related operations to be transactional with other educational service entities and storage operations and with other external service provider based operations. This is due to the fact that the services provided by a pluggable external services provider can be reformatted by an internal service provider to present a consistent user-interface and functionality via one or more application programming interfaces (APIs).

1.1.3 Provider Compensation Logic Support:

The educational adaptive provider architecture provides additional compensation logic for requested external provider operations that are unsuccessful. Details of provider compensation logic support will be provided later in Section 4.5.

1.1.4 Integrated Error Handling:

The educational adaptive provider architecture provides for integrated error-handling for external provider operations so that errors are propagated and displayed in a consistent and similar manner to users. This makes it easier for entities to build applications, services and utilities on an educational services framework. Details of integrated error handing will be provided later in Section 4.6.

1.1.5 Easy Integration:

The educational adaptive provider architecture helps institutions integrate existing service providers into a common provider framework. In essence, the architecture provides the ability to use and integrate existing and new institutional providers for authorization, authentication, communications, grouping, scoring, social networking, storage, various user functions, and other services as desired. This is valuable since most institutions have existing underlying technological provider investments which are hard to change.

1.1.6 Extensibility for Partners and Clients:

The educational adaptive provider architecture provides extensibility to add, remove, change/swap underlying technologies as needed without causing disruption to the applications, services or utilities that are built on existing computer systems and frameworks. Institutions and partners can develop their own providers if the existing providers do not meet their requirements. The newly developed providers can be easily plugged into the provider framework of the present education adaptive provider architecture without any code changes.

An overview of the educational adaptive provider architecture having been provided, the next sections will provide a description of exemplary processes for employing the educational adaptive provider architecture, an exemplary architecture in which the architecture can be practiced, and details and alternate embodiments of the architecture.

2.0 Exemplary Processes for Employing the Architecture

The educational adaptive provider architecture can be employed using various processes. Some exemplary processes for employing the adaptive provider architecture are described below.

Figure 1:
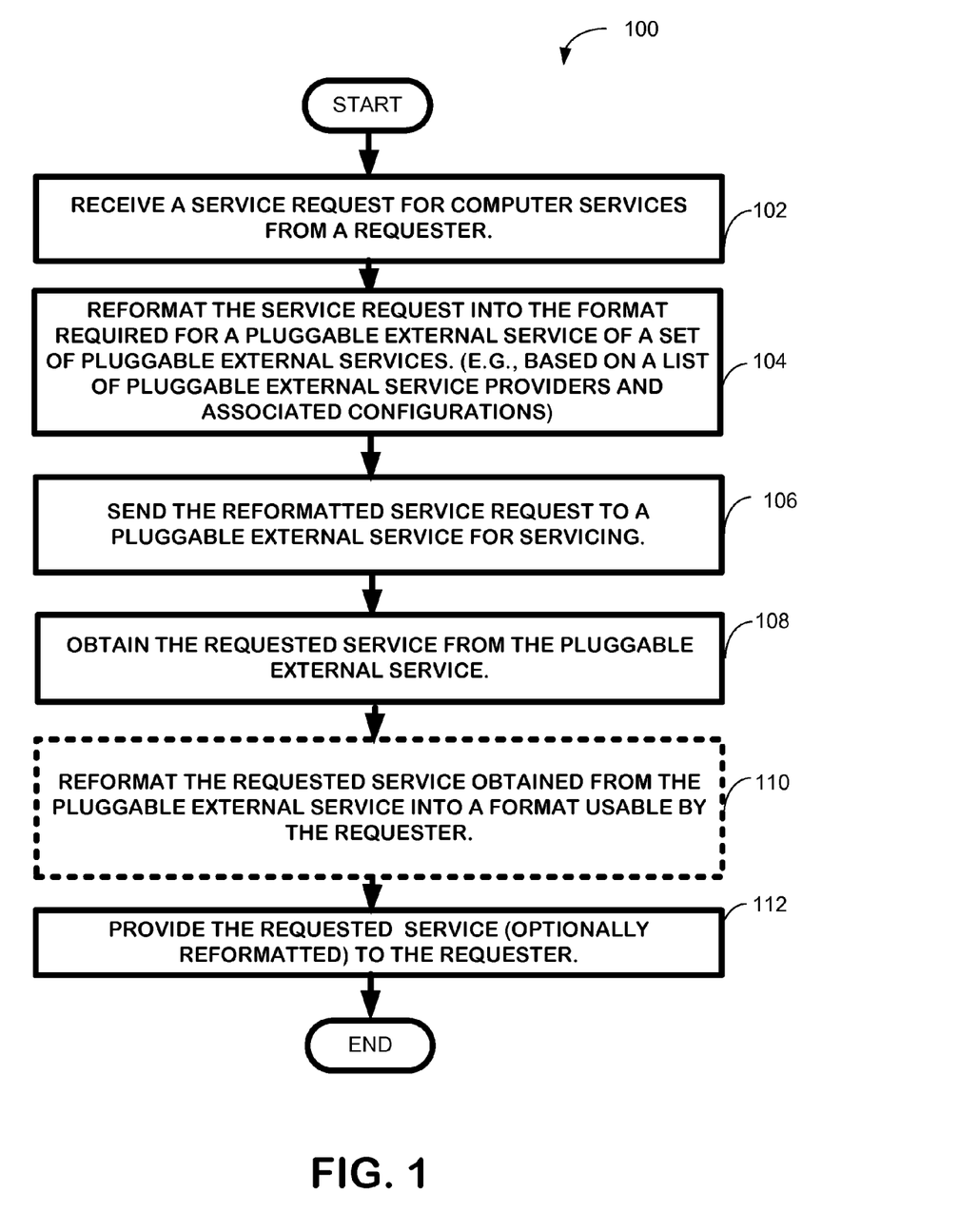
FIG. 1 is a flow diagram depicting a generalized exemplary embodiment of a process for employing the educational adaptive provider architecture.

In general, one exemplary process by which the educational adaptive provider architecture can be employed is shown in FIG. 1. As shown in FIG. 1, this embodiment of the educational adaptive provider architecture operates as follows. A request for computer services is received from a requester such as a user, as shown in block 102. For example, the service requested might be for authorization to access a computer system, user authentication, grouping of various users into a class, scoring or assessment of an exams, access to a social networking site or a class that is being taught, data storage and other user functions. The service request is reformatted into a format required by a pluggable external service provider of a set of pluggable external service providers, as shown in block 104. The format may be obtained, for example, by accessing a list of available pluggable external service providers and associated configurations and data formats. The reformatted service request is then sent to a pluggable external service provider for servicing (e.g., providing the service requested), as shown in block 106. As shown in block 108, the requested service is obtained from the pluggable external service provider. The requested service can be reformatted into a format usable by the requester, if required, as shown in block 110. As shown in block 112, the requested service, either reformatted or not, is then provided to the requester.

Figure 2:
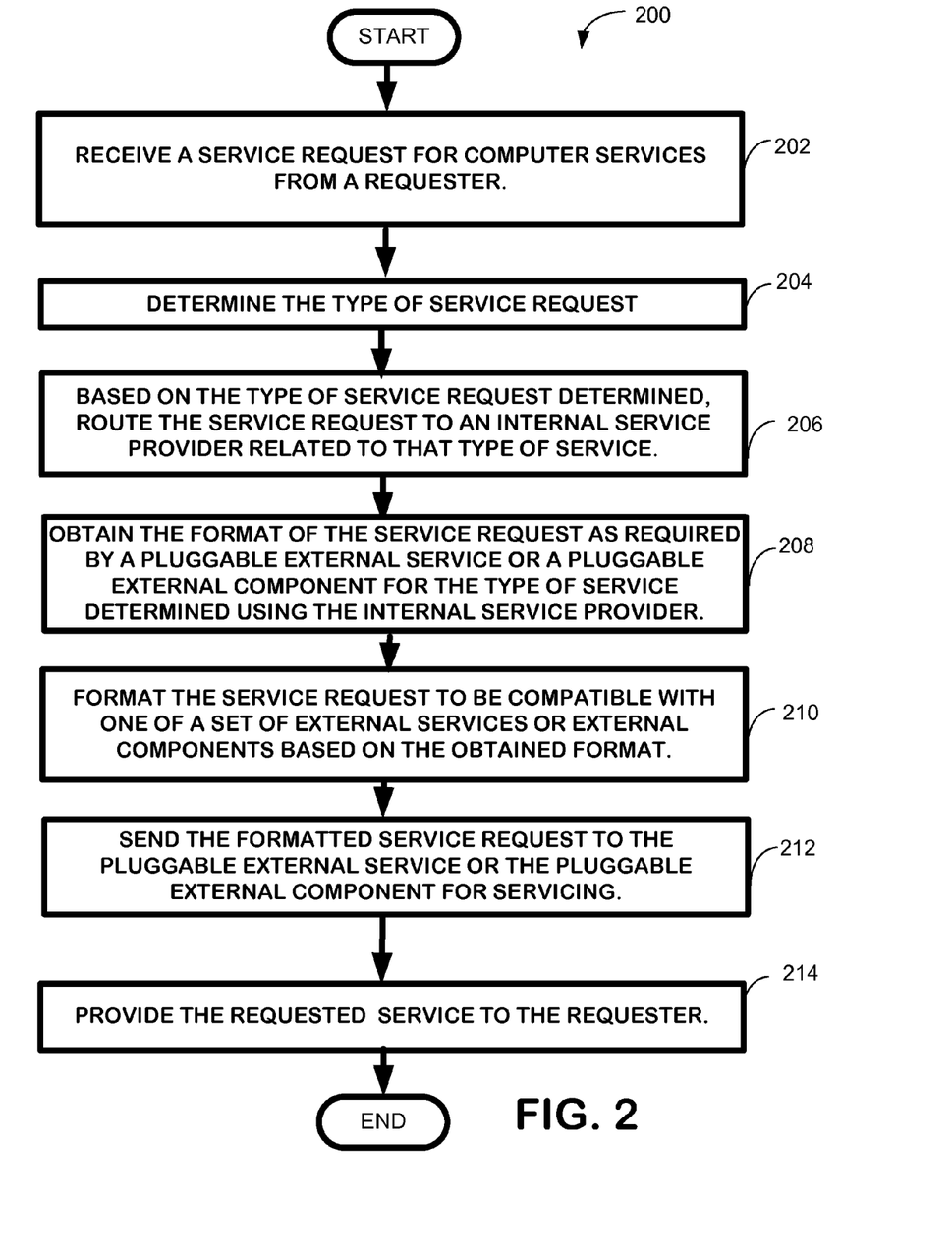
FIG. 2 is another flow diagram depicting another exemplary embodiment of a process for employing the educational adaptive provider architecture.

Another exemplary embodiment 200 for employing the educational adaptive provider architecture is shown in FIG. 2. In this embodiment a service request for computer services is received from a requester, as shown in block 202. The type of service request is determined, as shown in block 204. For example, the type of service requests can be determined by extracting a field in the service request that specifies the type of service requested. Based on the type of service request determined, the service request is routed to an internal service provider related to the type of service requested, as shown in block 206. As shown in block 208, the format of the service request required by a pluggable external service or a pluggable external component for the type of service determined is obtained. For example, the information can be extracted from a file that lists the pluggable external services providers and the associated configurations. The service request for computer services is then formatted to be compatible with one of a set of external services or external components based on the obtained format, as shown in block 210. The formatted service request is then sent to the pluggable external service provider or the pluggable external component for servicing, as shown in block 212. The requested service is then provided to the requester, as shown in block 214.

Figure 3:
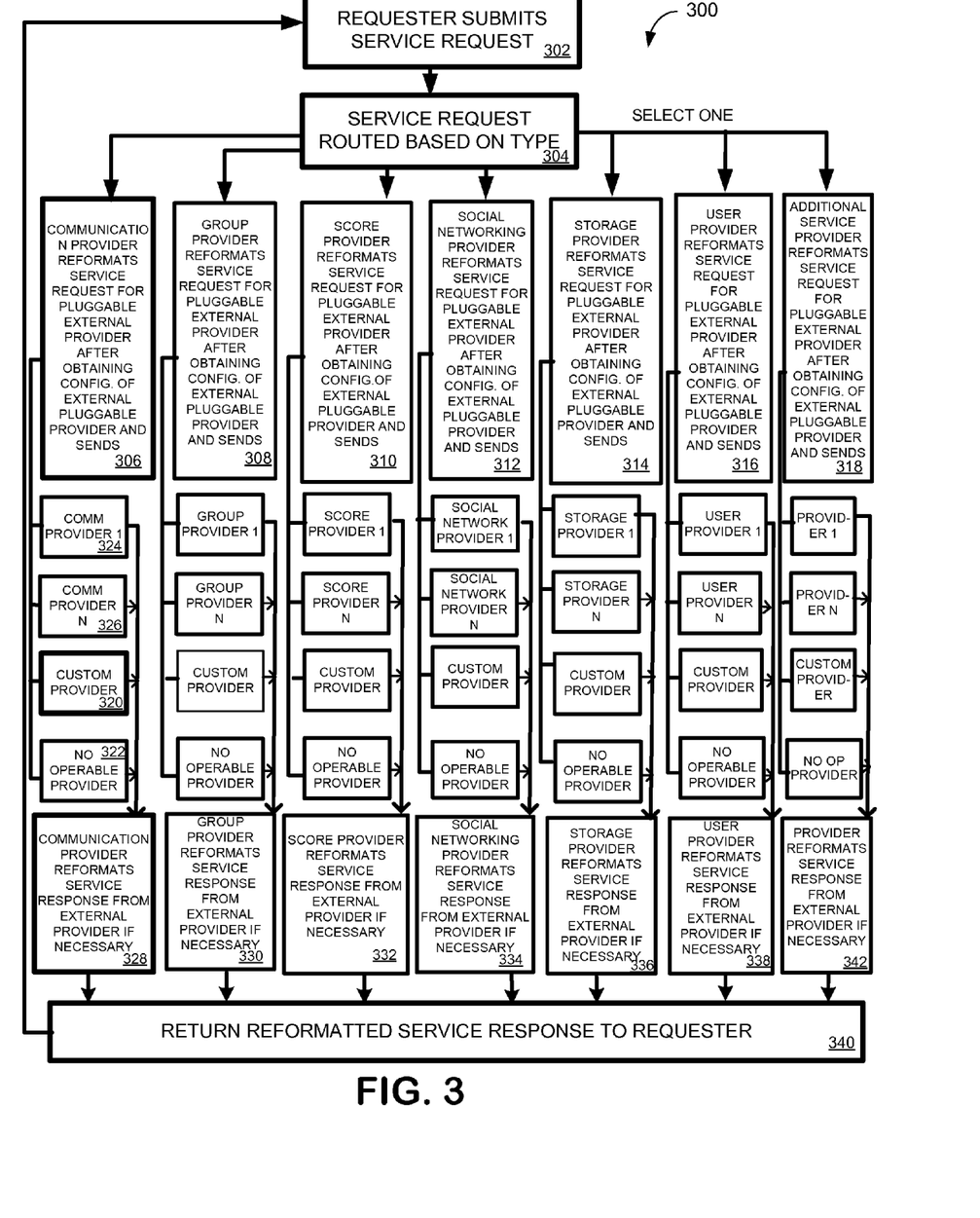
FIG. 3 is another flow diagram depicting yet another exemplary embodiment of a process for employing the educational adaptive provider architecture.

Yet another exemplary embodiment 300 for employing the adaptive provider architecture is shown in FIG. 3. In this embodiment, a requester sends a request for computer services, as shown in block 302. The request for computer services is routed to an internal services provider based on the type of request it is. For example, the service requested might be for authorization to access a computer system, user authentication, grouping of various users into a class, scoring or assessment of an exams, access to a social networking site or a class that is being taught, data storage and other user functions. So, as shown in FIG. 3, the service request might be routed to an internal communication provider (block 306), a group provider (block 308), a score provider (block 310), a social networking provider (block 312), a storage provider (block 314), a user provider (block 316) or another type of service provider 318. In this example, let it be assumed that the service request is for communication services and the request is submitted to an internal communication services provider (block 306). (This path is indicated by darker lined blocks.)

The selected internal service provider determines the type of external services provider suited to provide the external service after obtaining the availability and configuration of the pluggable external service providers (blocks 306, 308, 310, 312, 314, 316, 318). For each type of service there can be several pluggable external service providers available for selection, as shown in blocks 320, 322, 324 and 326). One of these can be a custom provider (e.g., block 320). Any of these external service providers can also be designated as a default service provider. Additionally, one option is a selection of no service provider, in which case no service will be provided by any pluggable external service provider (block 322). In this example, it is assumed that the internal communication provider (block 306) selects the custom pluggable external communications provider (block 320). The pluggable external service provider is selected based on the configuration obtained by the internal communication provider.

The internal service provider then employs the configuration required for the type of pluggable external service provider, and reformats the service request for the selected pluggable external service provider selected (as shown in blocks 306, 308, 310, 312, 314, 316, 318). The reformatted message is sent to the chosen pluggable external service provider that provides the service (e.g., block 322 in this example). The selected pluggable external service provider can provide the service directly to the requester, or the internal services provider can reformat the services as required by the requester if necessary (blocks 330, 332, 334, 336, 338, 328, 342).

It should be noted that although the above description generally relates to authorization, authentication, communication, grouping, scoring, social-networking, storage and user service providers, providers for other services can also be employed with the educational adaptive provider architecture.

3.0 Exemplary Embodiment of the Architecture

The exemplary process for employing the architecture having been provided, the following paragraphs describe an exemplary embodiment of an architecture in which one embodiment of the architecture can be practiced.

Figure 4:
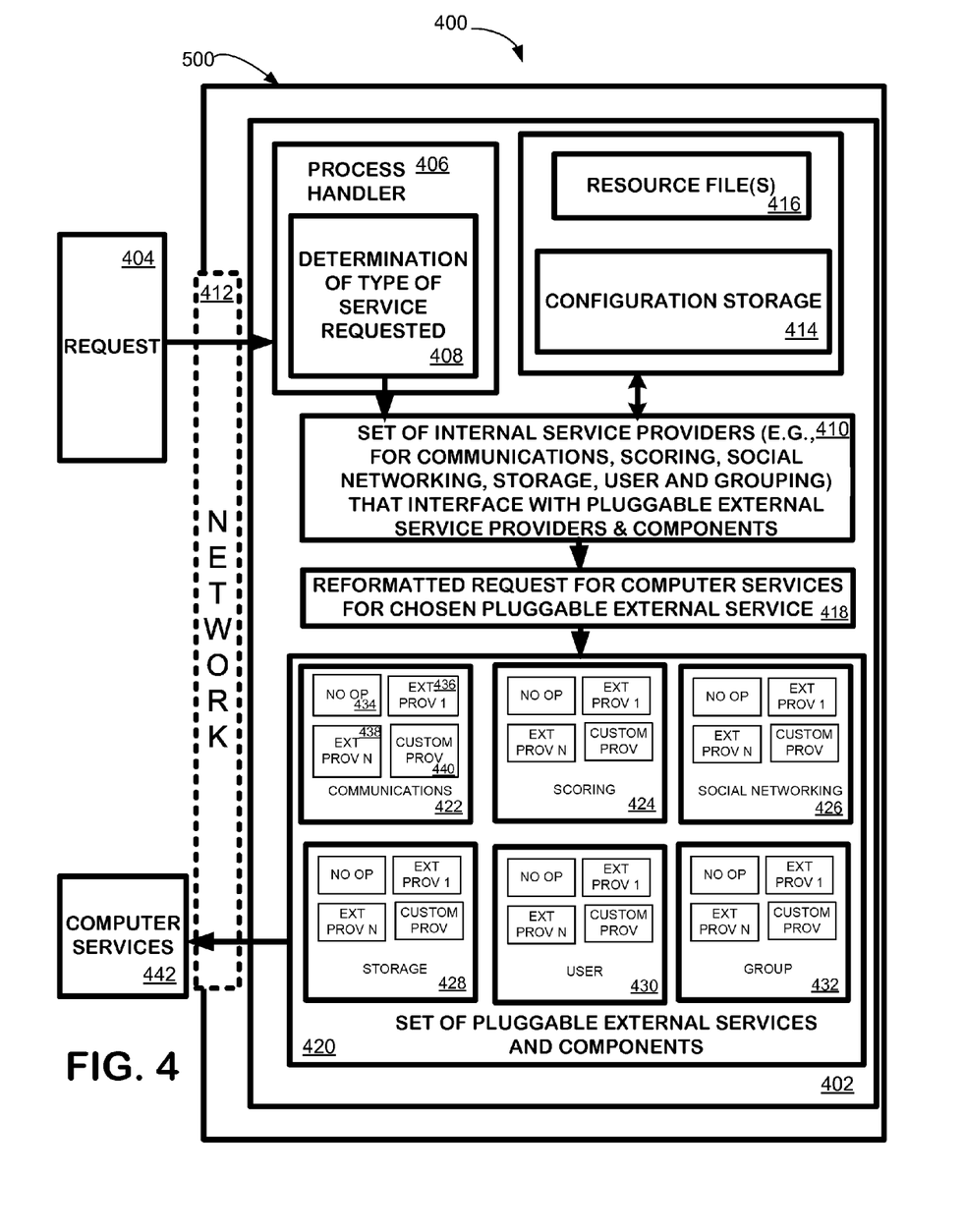
FIG. 4 is an exemplary architecture in which one embodiment of the educational adaptive provider architecture can be practiced.

FIG. 4 provides an exemplary architecture in which one embodiment of the educational adaptive provider architecture can be practiced. This exemplary architecture (block 400) includes an educational adaptive provider module 402 that typically resides on a computing device, such as for example, the computing device 500 discussed with respect to FIG. 5. A request for computer services 404 is input. A determination of the type of the request is made. For example, a determination is made in a process handler 406 that employs a type determination module 408 that determines whether the request is, for example, a communications, grouping, scoring, social networking, storage, or user operations type of service.

Based on the type of service request, the request is routed to one of a set of internal service providers related to the determined type of service request 410. This internal service provider 410 can be related to one of, for example, communications, grouping users for different purposes, scoring exams or other data, social networking, data storage, and other user operations. The chosen internal service provider of a provider framework 410 accesses the configuration 414 and provides a list of registered pluggable external service providers, and chooses and initializes a pluggable external service provider to handle the service request. The chosen internal service provider also obtains the configuration of the chosen pluggable external service provider from the configuration storage module 414. This configuration will be used, for example, to configure the service request received into a format compatible with a pluggable external services provider. For example, the external service provider can be chosen from one or more existing external service providers for the determined type of service. Or a custom provider can be selected. Optionally, the internal service provider can choose not select a provider at all for this service, in which case no service of the requested type will be provided. More specifically, an internal service provider 410 can choose a pluggable external service provider 422, 424, 426, 428, 430, 432 related to the type of service request from the set of pluggable external service providers 420. For each type of pluggable external service providers 422, 424, 426, 428, 430, 432 there can be several pluggable external service providers available for selection 434, 436, 438. Any of these can be a custom provider 440. The pluggable external provider is chosen by the provider framework based on the configuration maintained in the configuration storage module 414. One of these pluggable external service providers can also be designated as a default service provider. Additionally, one option is a selection of no service provider 434 (e.g., a stub is employed), in which case no service will be provided by any pluggable external service provider. The chosen internal service provider can also access any additional information needed from a resource file or files 416.

Once the pluggable external service provider is selected, the chosen internal service provider then reformats the service request in accordance with the configuration required by the chosen external service provider, as shown in block 418.

Once the service request is properly formatted for the chosen pluggable external service provider, the reformatted service request is sent to the chosen pluggable external services provider that provides the requested service 442. Both the initial service request 404 and the provided requested service 442 can be sent directly to the requester, or can be sent over a network 412, such as the Internet, for example.

The chosen internal service provider can also interface with the chosen pluggable external service provider to perform error handling and compensation logic as required, as will be discussed in more detail later.

4.0 Additional Details and Alternate Embodiments

An overview of the adaptive provider architecture, an exemplary architecture and exemplary processes having been provided, the following paragraphs provide details and alternate embodiments of the architecture.

4.1 Service Request and Internal Provider Details:

As discussed above, the internal service providers reformat service requests from a user or other entity into a format recognizable to a pluggable external service provider. This provides the ability to add, remove, change/swap underlying technologies and services without causing disruption to the applications, services or utilities that are built on existing computer systems and frameworks. Institutions and partners can develop their own providers if the existing providers do not meet their requirements. The newly developed providers can be easily plugged into the provider framework without any code changes.

4.1.1 Service Request:

As discussed previously, a service request is made for services. Generally such a service request includes the context (who is making the call), the action that needs to be performed, and the object that the action needs to be performed on (for example a blog or forum). For example, for a request for social networking services the service request would include the user ID of the requester, the ID of the social network (such as, for example a blog ID), and a request to access the social networking site. For a grouping service request (e.g., a request to be added to a group by a group provider ), the service request might include the user ID, the user login provider ID, as well as the reference of the group, along with the action requested (e.g., to be added to the group) and the registered application ID making the request.

4.1.2 Internal Communications Provider

The internal communications provider selects the pluggable external service to provide communications services and manages the communications with it. To this end, the internal communications provider reformats any communications service request routed to it to be compatible with a pluggable external communications provider. The external pluggable communications provider can provide, for example, the following communications services: send email, create schedule, update schedule, get schedule, cancel schedule, send message and get message (for e.g. these can be provided by Microsoft® Corporation's Office® Communication Server, Hotmail® and Microsoft® Exchange.)

The internal communications provider also provides error handling and compensation logic for the chosen pluggable external communication provider.

4.1.3 Internal Scoring Provider

The internal scoring provider selects a pluggable external service to provide scoring services and manages the scoring services provided by it. To this end, the internal scoring provider can reformat any scoring service request routed to it to be compatible with the pluggable external scoring provider. The pluggable external scoring provider can provide, for example, the following scoring services: scoring, rubrics, analytics retrievals and updates (For example. these are provided with Microsoft® Corporation's Semblio and Extended Type Service (ETS)).

The internal scoring provider also provides error handling and compensation logic for the chosen pluggable external scoring provider.

4.1.4 Internal Social Networking Provider

The internal social networking provider selects a pluggable external service to provide social networking services and manages the social networking services provided by it. These social networking services can include managing access to a course blog or forum provided over a network, for example. To this end, the internal social networking provider reformats any social networking service request routed to it to be compatible with the pluggable external social networking provider. The external pluggable social networking provider can provide, for example, the following social networking services: create blog, create forum (for example, these can be related to Microsoft® Corporation's Community Server, Windows Live™ and SharePoint® team services and portal server).

The internal social networking provider also provides error handling and compensation logic for the chosen pluggable external social networking provider.

4.1.5 Internal Storage Provider

The internal storage provider selects a pluggable external service to provide storage services and manages the storage services provided by it. To this end, the internal storage provider reformats any storage service request routed to it to be compatible with a pluggable external storage provider. The pluggable external storage provider can provide, for example, the following file sharing and storage services: add file, add folder, create file, create folder, update file, update folder, delete file, delete folder, get file, get folder, copy file, and move file (for example these can related to Microsoft® Windows-Live™, Sharepoint®, File Server and Sequence Query Language (SQL).

The internal storage provider also provides error handling and compensation logic for the chosen pluggable external storage provider.

4.1.6 Internal User Services Provider

The internal user services provider selects a pluggable external service to provide user services and manages the user services provided by it. To this end, the internal user services provider reformats any user services service request routed to it to be compatible with the pluggable external user services service provider. The external pluggable user services provider can provide, for example, the following user services: create user, update user, delete user, and get user profile (for example, these can be related to Microsoft's® Windows-Live™, Active Directory®, SharePoint® and SQL).

The internal user services provider also provides error handling and compensation logic for the chosen pluggable external user services provider.

4.1.7 Internal Group Provider

The internal group provider selects a pluggable external service provider to provide grouping services and manages the grouping services provided by it. To this end, the internal group provider reformats any group service request routed to it to be compatible with the pluggable external group provider. The external pluggable group provider can provide, for example, the following group services: create group, get group information, get group members, update group, delete group, add member, get member, update member, remove member, and check if a member is in a group (for e.g. these are tied to Microsoft's® Address-Book Clearing House (ABCH)—an online/cloud directory service, Active Directory®, SharePoint® and SQL).

The internal group provider also provides error handling and compensation logic for the chosen pluggable external group provider.

4.2 Configuration Storage and Initialization

As discussed previously, the selected internal provider reformats the received service request message by accessing a configuration database or configuration file. The configuration database or configuration file provides the configurations of the types of external pluggable service providers available for each type of service and provides the types of classes of information available for each type of external pluggable service provider. In one embodiment of the architecture, the configuration file includes provider name, provider type, default provider; and provider properties. For example, an exemplary format of a configuration file would be:

```
<providerTypes>
<groupProvider default="NoOpGroupProvider">
  <providers>
   <add name="ABCHGroupProvider"
type="Education.CoreService.GroupProvider.AbchGroupProvider,
```

-continued

```
MS.Education.CoreServices.GroupProvider" />
    <add name="NoOpGroupProvider"
type="Education.CoreService.GroupProvider.NoOpGroupProvider,
MS.Education.CoreServices.GroupProvider" />
  </providers>
</groupProvider>
<storageProvider default="NoOPStorageProvider">
  <providers>
    <add name="Live-Storage"
type="Education.CoreService.StorageProvider.WLStorageProvider,
MS.Education.CoreServices.StorageProvider" />
    <add name="SkyDrive"
type="Education.CoreService.StorageProvider.SkyDriveStorageProvider,
MS.Education.CoreServices.StorageProvider" />
    <add name="NoOPStorageProvider"
type="Education.CoreService.StorageProvider.NoOPStorageProvider,
MS.Education.CoreServices.StorageProvider" />
  </providers>
</storageProvider>
</providerTypes>
```

4.3 Resource File

One or more resource files can be used to provide additional information necessary for error handling, compensation logic and other functions. To this end a resource file might include: error codes, error messages, request messages, and so forth.

4.4 Decision Logic on Selecting a Pluggable External Service Provider

The internal provider is selected based on the service request type. The provider framework (e.g. an internal service provider) chooses a pluggable service provider to handle the service request and initializes the chosen external pluggable service provider based on the previously discussed configuration file.

4.5 Provider Compensation Logic Support:

The educational adaptive provider architecture provides additional compensation logic for provider specific operations. The educational adaptive provider architecture provides additional compensation logic, such as in the case when a pluggable external service provider does not handle a type of request. In this case the internal service provider calls the necessary function of the chosen pluggable external services provider to undo any change(s) caused by an unsuccessful request to perform a given operation. A call to an external services provider typically has two outcomes: either the operation succeeded or failed. If the operation failed the pluggable external services provider is requested to undo any changes made by the internal services provider.

4.6 Integrated Error Handling:

The educational adaptive provider architecture provides the ability to have integrated error-handling tied to provider specific operations so that errors are propagated and displayed in a consistent and similar manner to users of any systems employing the architecture. This makes it easier for entities to build applications, services and utilities on an educational services framework. Integrated error handling, in one embodiment, is implemented by maintaining an error code mapping of the internal error messages and the external services provider error messages, such as, for example, in a resource file accessible by the internal service provider. If an error occurs at the pluggable service provider, the error code of the pluggable external services provided is converted to an internal error message format and presented to the user. If no mapping is found for the pluggable external service provider then a generic provider error is presented.

5.0 The Computing Environment

The educational adaptive provider architecture is designed to operate in a computing environment. The following description is intended to provide a brief, general description of a suitable computing environment in which the educational adaptive provider architecture can be implemented. The architecture is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 5:
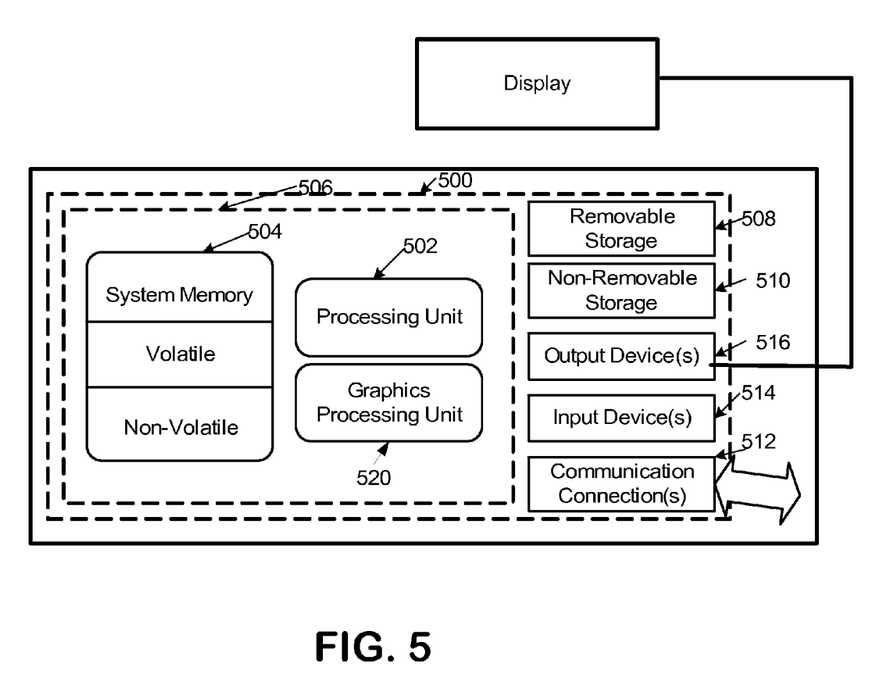
FIG. 5 is a schematic of an exemplary computing device in which the present educational adaptive provider architecture can be practiced.

FIG. 5 illustrates an example of a suitable computing system environment. The computing system environment is only one example of a suitable computing environment and is not intended to suggest any limitation as to the scope of use or functionality of the present architecture. Neither should the computing environment be interpreted as having any dependency or requirement relating to any one or combination of components illustrated in the exemplary operating environment. With reference to FIG. 5, an exemplary system for implementing the educational adaptive provider architecture includes a computing device, such as computing device 500. In its most basic configuration, computing device 500 typically includes at least one processing unit 502 and memory 504. The computing device 500 also has a graphics processing unit 520 to aid in accelerating graphics rendering, among other functions. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 has a display 518, and may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may have various input device(s) 514 such as a keyboard, mouse, pen, camera, touch input device, and so on. Output device(s) 516 such as speakers, a printer, and so on may also be included. All of these devices are well known in the art and need not be discussed at length here.

The educational adaptive provider architecture may be described in the general context of computer-executable instructions, such as program modules, being executed by a computing device. Generally, program modules include routines, programs, objects, components, data structures, and so on, that perform particular tasks or implement particular abstract data types. The educational adaptive provider architecture may be practiced in distributed computing environments where tasks are performed by remote processing devices that are linked through a communications network. In a distributed computing environment, program modules may be located in both local and remote computer storage media including memory storage devices.

6.0 Other Embodiments

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. For example, the architecture can be applied to other types of institutional computer systems besides educational systems. The specific features and acts described above are disclosed as example forms of implementing the claims.

Wherefore, what is claimed is:

1. A computer-implemented process that allows for the use of disparate software services provided in different formats, comprising:
   receiving a service request for computer services from a requester;
   determining a type of the service request;
   based on the type of the determined service request, routing the service request to one of a set of internal service providers;
   accessing, by the internal service provider, a list of external pluggable service providers and pluggable external components available for each type of service request and selecting an external pluggable service provider or a pluggable external component from the list;
   determining if the selected external service provider or the selected pluggable external component is available to render services for the type of service requested,
      upon determining that the selected external service provider or the selected pluggable external component is available to render services, obtaining a format of the service request as required by the selected pluggable external service provider or the selected pluggable external component by accessing a configuration file that provides the configurations of the types of external pluggable service providers and pluggable external components available for each type of service request;
      formatting the service request to be compatible with the selected pluggable external service provider or the selected pluggable external component based on the obtained format;
      sending the formatted service request to the selected pluggable external service provider or the selected pluggable external component for servicing; and
      providing the requested service for computer services from the selected pluggable external service provider or the selected pluggable external component to the requester;
   otherwise, suspending the rendering of services for the type of service requested until the selected external service provider or the selected pluggable external component becomes available.

2. The computer-implemented process of claim 1, further comprising reformatting the requested service provided by the selected pluggable external service provider or the selected pluggable external component using the internal service provider to a format required by the requester.

3. The computer-implemented process of claim 1 wherein the internal service provider is a communication service provider.

4. The computer-implemented process of claim 1 wherein the internal service provider is a group service provider.

5. The computer-implemented process of claim 1 wherein the internal service provider is a scoring service provider.

6. The computer-implemented process of claim 1 wherein the internal service provider is a social networking service provider.

7. The computer-implemented process of claim 1 wherein the internal service provider is a storage provider.

8. The computer-implemented process of claim 1 wherein the internal service provider is a user function provider.

9. The computer-implemented process of claim 1 wherein the external service, comprises one of a group comprising:
   an email service;
   a calendaring service;
   a search engine service;
   a web service;
   a scoring engine;
   a community server;
   a storage service;
   a directory service; or
   a SharePoint service.

10. A computer-implemented process that allows for the use of disparate software services provided in different formats from different providers, comprising:
   receiving a service request for computer services from a requester;
   determining a type of the service request;
   based on the type of the determined service request, routing the service request to an internal service provider related to that type of service;
   accessing, by the internal service provider, a list of external pluggable service providers and pluggable external components available for each type of service request and selecting an external pluggable service provider or a pluggable external component from the list;
   determining if the selected external service provider or the selected pluggable external component is available to render services for the type of service requested,
      upon determining that the selected external service provider or the selected pluggable external component is available to render services, obtaining the format of the service request as required by a pluggable external service or a pluggable external component by accessing a configuration file that provides the configurations of the types of external pluggable service providers and pluggable external components available for each type of service request;

formatting the service request to be compatible with one of a set of pluggable external services or the selected pluggable external components based on the obtained format;

sending the formatted service request to the pluggable external service or the pluggable external component for servicing; and providing the requested service to the requester;

otherwise, suspending the rendering of services for the type of service requested until the selected external service provider or the selected pluggable external component becomes available.

11. The computer-implemented process of claim 10 wherein obtaining the format of the service request further comprises accessing a configuration file that specifies the format and information required by the pluggable external service or pluggable component for the type of service determined.

12. The computer-implemented process of claim 11 wherein the configuration file further comprises the following information:
provider name,
provider type,
default provider; and
provider properties.

13. The computer-implemented process of claim 10 wherein the service request further comprises:
identification of the requester;
an action that needs to be performed; and
the identification of an object the action needs to be performed on.

14. The computer-implemented process of claim 13 wherein the internal service provider provides compensation logic.

15. A system that allows for the use of disparate software services provided by a number of software service providers, comprising:
a general purpose computing device;
a computer program comprising program modules executable by the general purpose computing device, wherein the computing device is directed by the program modules of the computer program to,
input a request for computer services from a requester;
determine a type of service request made;
based on the type of service request, route the service request to one of a set of internal service providers;
access, by the internal service provider, a list of external pluggable service providers available for each type of service request and choose an external pluggable service provider from the list;
determine if the chosen external service provider is available to render services for the type of service requested,
upon determining that the chosen external service provider is available to render services,
obtain a format of the service request as required by the chosen pluggable external service provider by accessing a configuration file that provides the configurations of the types of external pluggable service providers available for each type of service request;
initialize the chosen pluggable external service provider based on the obtained format;
reformat the service request in accordance with the format required by the chosen pluggable external service provider;
send the reformatted service request to the chosen pluggable external service provider for servicing; and
provide the requested service for computer services from the pluggable external service to the requester;
otherwise, suspend the rendering of services for the type of service requested until the chosen external service provider becomes available.

16. The system of claim 15 wherein the pluggable external service provider is a default service provider.

17. The system of claim 16 wherein the pluggable external service provider is a stub that provides no service.

18. The system of claim 15 wherein the internal service provider manages one of the following services:
communications,
grouping users for different purposes,
scoring exams or other data,
social networking,
data storage,
and user operations.

19. The system of claim 15, further comprising a module for choosing a pluggable external services provider, comprising:
configuration storage.

20. The system of claim 15 further comprising a module for providing error handling compatible with the external pluggable service providers.

* * * * *